US010169952B2

(12) United States Patent
Kelly et al.

(10) Patent No.: US 10,169,952 B2
(45) Date of Patent: Jan. 1, 2019

(54) PROCESSING CREDIT-RELATED EVENTS IN A WAGERING GAME SYSTEM

(71) Applicant: Bally Gaming, Inc., Las Vegas, NV (US)

(72) Inventors: Sean P. Kelly, Skokie, IL (US); Anthony J. Baerlocher, Henderson, NV (US); Ying Lou, Chicago, IL (US); Nickey C. Shin, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 516 days.

(21) Appl. No.: 14/836,798

(22) Filed: Aug. 26, 2015

(65) Prior Publication Data

US 2016/0063813 A1 Mar. 3, 2016

Related U.S. Application Data

(60) Provisional application No. 62/041,908, filed on Aug. 26, 2014.

(51) Int. Cl.
*A63F 13/00* (2014.01)
*G07F 17/32* (2006.01)

(52) U.S. Cl.
CPC ........ *G07F 17/3244* (2013.01); *G07F 17/323* (2013.01)

(58) Field of Classification Search
CPC ......................... G07F 17/3225; G07F 17/3244
See application file for complete search history.

(56) References Cited

U.S. PATENT DOCUMENTS

| | | | |
|---|---|---|---|
| 6,379,248 | B1 | 4/2002 | Jorasch et al. |
| 6,547,131 | B1 | 4/2003 | Foodman et al. |
| 6,558,256 | B1 | 5/2003 | Saunders |
| 6,607,441 | B1 | 8/2003 | Acres |
| 6,676,522 | B2 | 1/2004 | Rowe et al. |
| 6,712,697 | B2 | 3/2004 | Acres |
| 6,739,975 | B2 | 5/2004 | Nguyen et al. |
| 6,746,330 | B2 | 6/2004 | Cannon |
| 6,800,029 | B2 | 10/2004 | Rowe et al. |
| 6,846,238 | B2 | 1/2005 | Wells |
| 6,852,031 | B1 | 2/2005 | Rowe |
| 6,892,182 | B1 | 5/2005 | Rowe et al. |
| 6,969,320 | B2 | 11/2005 | Lind et al. |

(Continued)

FOREIGN PATENT DOCUMENTS

| | | |
|---|---|---|
| WO | 2001070355 | 9/2001 |
| WO | 2001083061 | 11/2001 |

(Continued)

*Primary Examiner* — David L Lewis
*Assistant Examiner* — Robert Mosser
(74) *Attorney, Agent, or Firm* — Marvin A. Hein

(57) ABSTRACT

Embodiments include a method for presenting a credit balance affected by a plurality of wagering games. The method can include detecting wager amounts and win amounts associated with a plurality of wagering games conducted via a wagering game machine. The method can include presenting, on a display device of the wagering game machine, graphical identifiers indicating an order in which the wager amounts will decrease a credit balance and the win amounts will increase the credit balance. The method can include according to the order, increasing the credit balance on the display device by each of the win amounts and decreasing the credit balance on the display device by each of the wager amounts.

11 Claims, 13 Drawing Sheets

(56) References Cited

U.S. PATENT DOCUMENTS

| | | | |
|---|---|---|---|
| 7,107,245 | B1 | 9/2006 | Kowalick |
| 7,175,527 | B2 | 2/2007 | Bryant |
| 7,232,371 | B2 | 6/2007 | Gatto et al. |
| 7,261,635 | B2 | 8/2007 | Wlaker et al. |
| 7,324,973 | B2 | 1/2008 | Taylor |
| 7,390,263 | B1 | 6/2008 | Acres |
| 7,617,151 | B2 | 11/2009 | Rowe |
| 7,699,703 | B2 | 4/2010 | Muir et al. |
| 7,704,143 | B2 | 4/2010 | Baltz et al. |
| 7,771,277 | B2 | 8/2010 | Chamberlain et al. |
| 7,780,517 | B2 | 8/2010 | Saffari et al. |
| 7,801,736 | B1 | 9/2010 | Halbritter et al. |
| 7,837,557 | B2 | 11/2010 | Boyd |
| 7,850,528 | B2 | 12/2010 | Wells |
| 7,862,426 | B2 | 1/2011 | Walker et al. |
| 7,867,095 | B2 | 1/2011 | Mattice et al. |
| 7,874,911 | B2 | 1/2011 | Walker et al. |
| 7,927,211 | B2 | 4/2011 | Rowe et al. |
| 7,950,996 | B2 | 5/2011 | Nguyen et al. |
| 7,963,843 | B2 | 6/2011 | Martin et al. |
| 7,988,553 | B2 | 8/2011 | Kastner et al. |
| 7,993,197 | B2 | 8/2011 | Kaminkow |
| 8,016,666 | B2 | 9/2011 | Angell et al. |
| 8,070,576 | B2 | 12/2011 | Bennett et al. |
| 8,070,588 | B1 | 12/2011 | Muskin |
| 8,079,904 | B2 | 12/2011 | Griswold et al. |
| 8,083,592 | B2 | 12/2011 | Wells |
| 8,088,001 | B2 | 1/2012 | Wells |
| 8,088,014 | B2 | 1/2012 | Wells |
| 8,118,668 | B2 | 2/2012 | Gagner et al. |
| 8,202,164 | B2 | 6/2012 | Lechner et al. |
| 8,208,612 | B2 | 6/2012 | Wlaker et al. |
| 8,226,474 | B2 | 7/2012 | Nguyen et al. |
| 8,241,119 | B2 | 8/2012 | Wells |
| 8,241,127 | B2 | 8/2012 | Kovacs |
| 8,243,929 | B2 | 8/2012 | Wells et al. |
| 8,257,172 | B2 | 9/2012 | Collett |
| 8,267,792 | B2 | 9/2012 | Buchholz et al. |
| 8,272,947 | B2 | 9/2012 | Gagner et al. |
| 8,282,465 | B2 | 10/2012 | Giobbi |
| 8,282,468 | B2 | 10/2012 | Huntley et al. |
| 8,282,473 | B2 | 10/2012 | Crivelli |
| 8,282,480 | B2 | 10/2012 | Wells et al. |
| 8,282,490 | B2 | 10/2012 | Arezina et al. |
| 8,306,879 | B2 | 11/2012 | Nonaka |
| 8,315,948 | B2 | 11/2012 | Walker et al. |
| 8,317,604 | B2 | 11/2012 | Wells |
| 8,333,655 | B2 | 12/2012 | Gagner et al. |
| 8,336,697 | B2 | 12/2012 | Wells |
| 8,371,937 | B2 | 2/2013 | Wells |
| 8,393,955 | B2 | 3/2013 | Arezina et al. |
| 8,419,527 | B2 | 4/2013 | Gagner et al. |
| 8,419,548 | B2 | 4/2013 | Gagner et al. |
| 8,430,745 | B2 | 4/2013 | Agarwal et al. |
| 8,439,746 | B2 | 5/2013 | Gagner et al. |
| 8,463,711 | B2 | 6/2013 | Cunningham, II et al. |
| 8,479,908 | B2 | 7/2013 | Wells |
| 8,500,547 | B2 | 8/2013 | Weiss |
| 8,512,118 | B2 | 8/2013 | Lui et al. |
| 8,517,810 | B2 | 8/2013 | Vann |
| 8,529,345 | B2 | 9/2013 | Nguyen |
| 8,568,228 | B2 | 10/2013 | Acres |
| 8,591,319 | B2 | 11/2013 | Walker et al. |
| 8,597,106 | B2 | 12/2013 | Schneider |
| 8,597,110 | B2 | 12/2013 | Kammler et al. |
| 8,597,111 | B2 | 12/2013 | Lemay et al. |
| 8,597,116 | B2 | 12/2013 | Nguyen et al. |
| 8,616,962 | B2 | 12/2013 | Anderson et al. |
| 8,616,981 | B1 | 12/2013 | Guinn et al. |
| 8,622,815 | B2 | 1/2014 | Allen et al. |
| 8,628,422 | B2 | 1/2014 | Allen et al. |
| 8,632,397 | B2 | 1/2014 | Sommer et al. |
| 8,632,403 | B2 | 1/2014 | Nguyen et al. |
| 8,641,518 | B2 | 2/2014 | Davis et al. |
| 8,641,532 | B2 | 2/2014 | Morrow et al. |
| 8,662,996 | B2 | 3/2014 | Sommer et al. |
| 8,668,565 | B2 | 3/2014 | Ansari et al. |
| 8,676,685 | B2 | 3/2014 | Rowe |
| 8,684,843 | B2 | 4/2014 | Arezina et al. |
| 2005/0215307 | A1 | 9/2005 | Jarvis et al. |
| 2008/0305862 | A1 | 12/2008 | Walker et al. |
| 2009/0131146 | A1 | 5/2009 | Arezina et al. |
| 2010/0248818 | A1 | 9/2010 | Aoki et al. |
| 2011/0028205 | A1 | 2/2011 | Parrott |
| 2011/0143834 | A1 | 6/2011 | Guinn et al. |
| 2013/0023339 | A1 | 7/2011 | Davis et al. |
| 2011/0300926 | A1 | 12/2011 | Englman et al. |
| 2012/0184347 | A1 | 7/2012 | Freele |
| 2012/0315981 | A1 | 12/2012 | Gagner et al. |
| 2013/0017884 | A1 | 1/2013 | Price et al. |
| 2013/0053136 | A1 | 2/2013 | Lemay et al. |
| 2013/0053148 | A1 | 2/2013 | Nelson et al. |
| 2013/0072289 | A1 | 3/2013 | Nelson et al. |
| 2013/0084972 | A1 | 4/2013 | Frady |
| 2013/0084973 | A1 | 4/2013 | Frady |
| 2013/0130781 | A1 | 5/2013 | Anderson et al. |
| 2013/0196755 | A1 | 8/2013 | Nelson et al. |
| 2013/0203482 | A1 | 8/2013 | Singer et al. |
| 2013/0252714 | A1 | 9/2013 | Buchholz et al. |
| 2013/0260889 | A1 | 10/2013 | Lemay et al. |
| 2013/0274016 | A1 | 10/2013 | Gagner et al. |
| 2013/0310161 | A1 | 11/2013 | Walker et al. |
| 2013/0337890 | A1 | 12/2013 | Earley et al. |
| 2013/0344942 | A1 | 12/2013 | Price et al. |
| 2014/0087849 | A1 | 3/2014 | Page et al. |
| 2014/0087853 | A1 | 3/2014 | Lemay et al. |
| 2015/0045112 | A1 | 2/2015 | Donavan et al. |

FOREIGN PATENT DOCUMENTS

| | | |
|---|---|---|
| WO | 2009111515 | 9/2009 |
| WO | 2012109281 | 8/2012 |
| WO | 2013043369 | 3/2013 |

PROCESSING CREDIT-RELATED EVENTS IN A WAGERING GAME SYSTEM

RELATED APPLICATIONS

This application claims priority benefit of U.S. Provisional Application No. 62/041,908 filed Aug. 26, 2014. The application Ser. No. 62/041,908 Application is incorporated by reference herein in its entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2015, WMS Gaming, Inc.

FIELD

Embodiments of the inventive subject matter relate generally to wagering game systems, and more particularly to presenting credit-related events in wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Introduction

Some wagering game systems enable players to contemporaneously play multiple wagering games. Although multiple games may be ongoing at a given time, all the games may not be represented in a user interface ("UI"). That is, some games may be running "behind the scenes". For example, a player may be playing two video slots games in the UI, and also playing Keno and a fishbowl play-while-away game behind the scenes (i.e., Keno and the fishbowl game do not appear on the UI). In the fishbowl game, players wager on whether virtual fish will accomplish tasks that win the wagers. The fish are active even when players choose not to watch the game in a UI. Hence, such games are referred to as "play-while-away" games. Some play-while-away games enable players to automatically place wagers via player accounts, such as when wagers are needed to keep games going, when wagers are needed to start new games, etc.

Some wagering game systems track all credit transactions with a single credit meter controlled by one of the wagering games. Other systems use multiple credit meters to track credit transactions. In any case, as players play multiple wagering games (some games appearing in the UI and others not represented in the UI), numerous events can affect the credit meter in a narrow time frame. Bursts of credit meter changes may confuse players, particularly when some credit meter changes arise from games not shown in the user interface. After seeing several quick changes to a credit balance, players may not understand what caused the credit balance to change.

Figure 1:
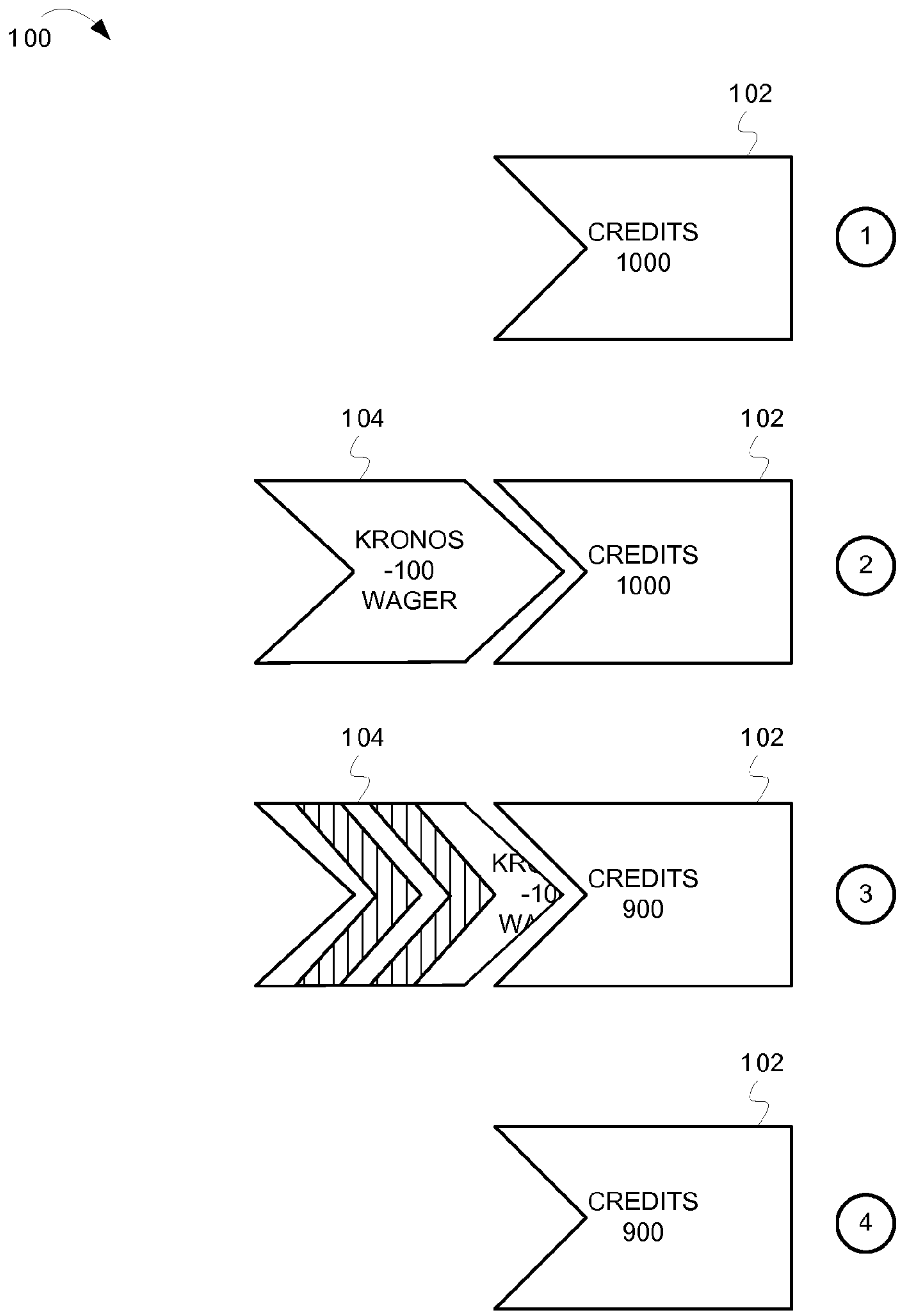
FIG. 1 is a diagram showing a graphical progression used to indicate credit-related events that affect a credit balance.

Some embodiments of the inventive subject matter utilize a single credit meter to represent all credit-related events associated with a plurality of wagering games, some of which are (or may have been) contemporaneously ongoing. To eliminate confusion about credit balances, some embodiments provide graphical indicators that explain impending changes to the credit meter. For example, for every event affecting the credit balance, embodiments present chevron-shaped tags explaining the event. In some instances, the chevron-shaped tags appear next to the credit meter, and graphically merge into the credit meter when the system changes the credit balance. FIG. 1 illustrates this concept.

FIG. 1 is a diagram showing a graphical progression used to indicate credit-related events that affect a credit balance. Credit-related events include events affecting the credit balance, such as wagers, wins, cash-outs, etc. In FIG. 1, a credit meter 102 shows a credit balance associated with a plurality of wagering games. Some of those wagering games may be represented in a user interface, while others may not appear in the user interface. FIG. 1 shows the graphical progression over three stages. The graphical progression of FIG. 1 can be presented in any suitable user interface, and on any suitable display device.

During stage 1, the credit meter 102 shows a credit balance of 1000 credits. During stage 1, the credit meter 102 appears with no tags. Thus, no credit-related events have occurred during stage 1. After stage 1, a player wagers one hundred credits on a game (e.g., a slots game named Kronos). During stage 2, as a result of the 100 credit wager, the system presents a chevron-shaped tag 104 next to the credit meter 102. The tag 104 represents an impending 100 credit reduction to the credit balance. At this point, the system has not shown any reduction to the credit balance itself (credit balance=1000).

During stage 3, the system presents a graphical sequence showing the wager (represented by tag 104) merging into the credit meter 102. The graphical sequence can include animations showing text (e.g., "Kronos", "wager", and "−100") merging into the credit meter 102. Also, the system reduces the credit balance by 100 credits, changing the credit balance from 1000 credits to 900 credits. During stage 4, the tag 104 disappears. The graphical progression, shown in stages 1-4, can occur in any time frame suitable for enabling players to understand the credit-related events (e.g., wagers, wins, etc.), and their effects on the credit balance.

In some embodiments, the event tags are color-coded. For example, win events may appear in green, wager events may appear in gray (no matter which game), add-credit events may appear in yellow, and cash-out evens may appear in tan. Similarly, the event tags may have different sizes, where the larger tags are more recent events.

Although the example in FIG. 1 involves only one wager for one wagering game, embodiments apply this concept to multiple credit-related events (e.g., wagers, wins, etc.) arising from multiple wagering games. As events arise, some embodiments daisy-chain additional tags to the credit meter 102. Some embodiments add tags in whatever order the credit-related events arose. Similarly, some embodiments change the credit balance in the order that the tags were added.

Figure 2:
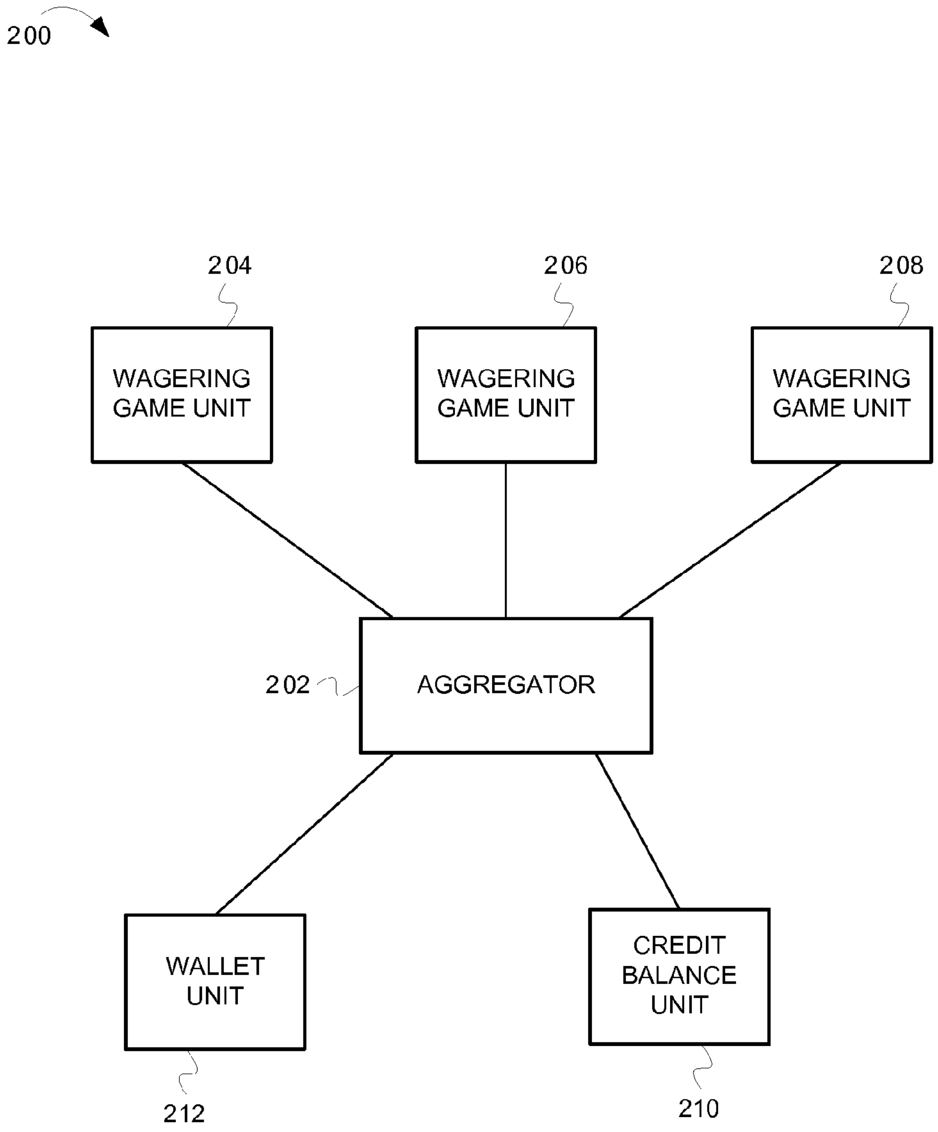
FIG. 2 is a block diagram illustrating a wagering game system capable of processing credit-related events, according to some embodiments of the inventive subject matter.

As described above, some embodiments are capable of conducting multiple wagering games (contemporaneously or otherwise), and tracking credit-related events for those games. Some embodiments track credit-related events by exchanging messages between components in the system. For example, wagering game components may pass messages to a credit balance unit, which processes the messages and updates a credit balance. As part of a process for updating the credit balance, the credit balance unit can present graphical indicators that indicate impending updates to the credit balance (e.g., see FIG. 1). FIG. 2 shows components that can track credit-related events for multiple wagering games.

Although FIG. 1 describes some embodiments, the following sections describe many other features and embodiments.

Example System Architecture

This section describes an example component architecture and presents structural aspects of some embodiments. This section also describes how components can exchange messages about credit-related events in a wagering game system.

FIG. 2 is a block diagram illustrating a wagering game system capable of processing credit-related events, according to some embodiments of the inventive subject matter. In FIG. 2, a system 200 includes an aggregator 202, wagering game units 204, 206, 208, wallet unit 212, and credit balance unit 210.

The aggregator 202 receives and distributes messages to the components of the system 200. In some embodiments, components register with the aggregator 202 to disseminate and receive messages. In one scenario, the credit balance unit 210 subscribes with the aggregator 202 to receive credit-related messages from the wagering game units 204, 206, 208, and the wallet unit 212. Similarly, the wagering game units 204, 206, 208, and wallet unit 212 register with the aggregator 202 to publish credit-related messages. As a result, the credit balance unit 210 receives all credit-related messages published by the wagering game units and the wallet unit. More examples of messaging are provided below.

Each of the wagering game units 204, 206, 208 can operate in parallel, and conduct different wagering games. For example, the wagering game unit 204 can conduct slots games of a particular type, theme, etc. The wagering game unit 206 can conduct video poker games, while the wagering game unit 208 can conduct various play-while-away games, such as the fishbowl game (noted above). Although the system 200 includes three wagering game units, embodiments can include any suitable number of wagering game units. Furthermore, the wagering game units can be configured to present any suitable wagering games, such as slots, poker, blackjack, etc. The wagering game units can present these games in a play-while-away mode, and they can present other play-while-away games (e.g., fishbowl, keno, video lottery, etc.). The wagering game units can present some games in a user interface, while also conducting some games behind-the-scenes. For example, some of the wagering game units can present slots games in a user interface on a display device, whereas others can conduct games that are not represented in the user interface. Timing of the games can vary. In some instances, games may occur sequentially. In other instances, games may occur at the same time, they may overlap in time (e.g., a portion of one game occurs during a portion of another game). As part of a process for reporting credit-related events, the wagering game units 204, 206, 208 send messages to the aggregator 202. This will be described in more detail below.

The wallet unit 212 can process financial transactions for players. The wallet unit 212 can store funds, procure funds from outside funding sources (e.g., bank, credit source, etc.), provide funding for playing wagering games, etc. For example, the wallet unit 212 may draw funds from a player's bank account, and store those funds for use in playing wagering games. The player may initiate a gaming session involving one or more of the wagering game units. The wallet unit 212 can provide credits for games conducted by the wagering game units. The wallet unit 212 can also receive funds from the credit balance unit 210, such as when a player cashes-out during a gaming session.

The credit balance unit 210 can maintain a credit balance indicating credit-related events arising from operations of the wagering game units 204, 206, 208, and the wallet unit 212. The credit balance unit 210 can also maintain a graphical representation of the credit balance in a user interface. As described above, the credit balance unit 210 can register with the aggregator 202 to receive credit-related messages from the wagering game units 204, 206, 208 and the wallet unit 212. The credit balance unit 210 can maintain a credit balance by incrementing and decrementing the balance according to the credit-related messages. For example, the credit balance unit 210 may receive a credit-related message from the wallet unit 212. The credit-related message may indicate that a player has made 1000 credits available for wagering. In response to the message, the credit balance unit 210 can increment an initial credit meter balance of zero credits to a balance of 1000 credits. The credit balance unit 210 can also update the credit balance in the user interface.

This discussion continues with more details about tracking credit-related events by exchanging messages.

Figure 3:
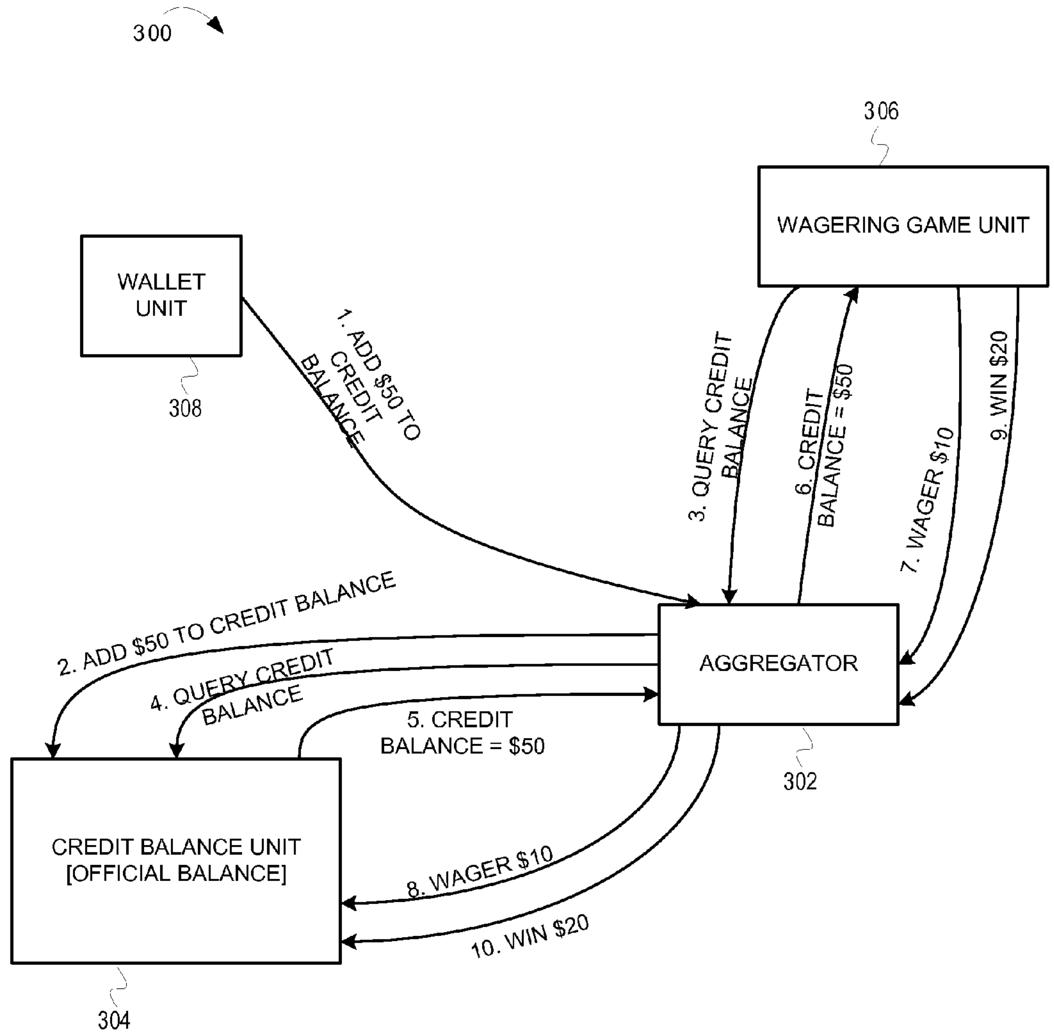
FIG. 3 is a block diagram showing how exchanging messages facilitates tracking credit-related events in a wagering game system.

FIG. 3 is a block diagram showing how exchanging messages facilitates tracking credit-related events in a wagering game system. FIG. 3 shows four components exchanging messages—a wallet unit 308, wagering game unit 306, credit balance unit 304, and aggregator 302. When components initialize and become operational, they register with the aggregator 302 to publish and receive certain messages. In some embodiments, components need not register to publish messages, as all messages pass through the aggregator 302. For example, the credit balance unit 304 may register with the aggregator 302 to receive credit-related messages from the wallet unit 308, and the wagering game unit 306. After registering with the aggregator 302, the credit balance unit 304 will receive all credit-related messages published by the wallet unit 308 and the wagering game unit 306. The credit balance unit 304 can use these messages to track a credit balance. Additionally, the credit balance unit 304 can use these messages to present graphical indicators (e.g., chevron-shaped tags—see FIG. 1) explaining events affecting the credit balance.

In FIG. 3, a flow of messages occurs in 10 stages. During stage 1, the wallet unit 308 publishes a credit-related message indicating that a player has made 50 credits available for wagering. The aggregator 302 receives this message, and forwards the message to the credit balance unit 304 (see stage 2). In turn, the credit balance unit 304 can increase the credit balance by 50 credits (e.g., increasing a zero balance to a 50 credit balance). Although not shown in FIG. 3, the credit balance unit 304 can update the credit balance in a user interface (e.g., the credit balance unit 304 can update a credit meter in the user interface). Before incrementing the balance by 50 credits, the credit balance unit 304 can present a graphical indicator indicating that the credit balance will increase by 50 credits because the player added credits from an electronic wallet.

Some credit-related messages can be queries. For example, a wagering game unit may query the credit balance unit to determine whether the credit balance is sufficient to cover a particular wager. Stages 3-6 describe such a query. During stages 3 and 4, the wagering game unit 306 transmits a query message to the aggregator 302, which forwards the message to the credit balance unit 304. During stages 5 and 6, the credit balance unit 304 transmits a message indicating that the credit balance is 50 credits. The message goes to the aggregator 302, which forwards the message to the wagering game unit 306.

During stages 7 and 8, the wagering game unit 306 transmits a wager message indicating a player has wagered 10 credits. The aggregator 302 forwards the message to the credit balance unit 304. After receiving the wager message, the credit balance unit 304 can decrease the credit balance, and update credit balance in the user interface. As part of a process for updating user interface, the credit balance unit 304 can present, in the UI, an event tag (or other graphical indicia) indicating an impending 50 credit reduction to the credit balance. In some embodiments, after the event tag appears for a given time period, the credit balance unit 304 removes the tag from the UI, and reduces the credit meter balance shown in the UI. In some embodiments, the credit balance appears on a credit meter in the UI.

During stages 9 and 10, the wagering game unit 306 transmits a credit-related message indicating a player won 20 credits. The aggregator 302 receives the message and forwards the message to the credit balance unit 304. In turn, the credit balance unit 304 increases the credit balance, and updates the credit balance in the UI (e.g., updates a credit meter in the UI). As part of updating the UI, before showing an increase to the credit balance, the credit balance unit 304 can present an event tag indicating an impending 20 credit increase. After the tag has been displayed for a given time period, credit balance unit 304 can remove the tag and increase the credit balance in the UI.

The example shown in FIG. 3 involves a single wagering game unit. However, embodiments support messaging for any number of wagering game units. As the number of wagering game units increases, the number of credit-related messages may drastically increase. With a large volume of credit-related messages, the credit balance will frequently change. Some embodiments use event tags and other graphical indicia to indicate what events are affecting the credit balance (e.g., credit balance shown on a credit meter in the UI).

Figure 4:
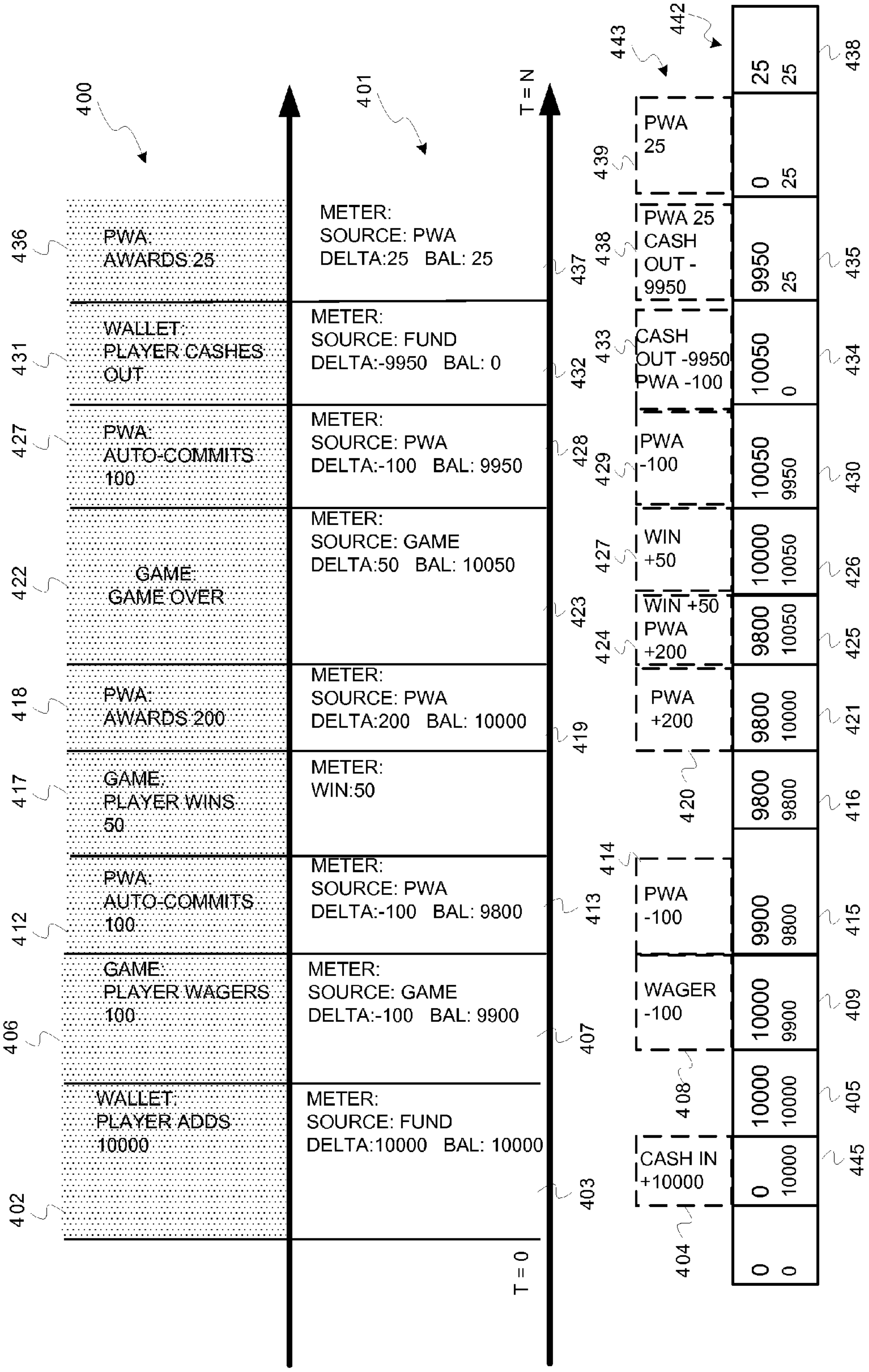
FIG. 4 is a conceptual diagram showing credit-related events and how they affect a credit balance, according to some embodiments.

FIG. 4 is a conceptual diagram showing credit-related events and how they affect a credit balance, according to some embodiments. FIG. 4 shows an event stream 400 and corresponding message stream 401. As shown, the message and event streams progress from time=0 to time=N (where N>1). Although not shown in FIG. 4, the messages may flow through an aggregator that publishes them to other components, as discussed above (see discussion of FIGS. 2 and 3). In FIG. 4, a credit balance queue 442 shows credit balance changes over time. Each element in the credit balance stream 442 shows two credit balances: the bottom balance is the actual authoritative balance, whereas the top balance is what currently appears in the UI.

In the credit event queue 443, event tags correspond with events in the event stream 400. The credit balance stream 442 shows how the credit balance is updated based on the event tags in the credit event queue 443. The following discussion will describe how the system uses the event and message streams to create event tags and update credit balances.

In FIG. 4, the event stream 400 begins with an event 402. The event 402 is a wallet event indicating that a player wants to add 10,000 credits from a wallet to the credit balance. In an embodiment employing the architecture shown in FIG. 2, a wallet unit 212 may detect the event 402. Consequently, the wallet unit 212 may send a corresponding message 403 to a credit balance unit 210. Upon receiving the message 403, the credit balance unit can determine the actual credit balance, even though it has not yet updated the UI to indicate the actual credit balance (see 445). The credit balance unit 210 can also add an event tag 404 to its internal credit event queue 443. The event tag 404 indicates a credit-related event that will increment the credit balance (e.g., as shown on a credit meter in the UI) by 10,000 credits. The credit balance unit can present a graphical representation of the event tag 403 in the user interface (e.g., see FIG. 1). Before updating the credit balance in the UI, the credit balance unit may introduce a brief delay to enable the player to visually inspect the event tag presented in the UI. After the delay, the credit balance unit can update the credit balance in the UI—changing it from zero to 10,000 credits (see 405).

As the event stream 400 progresses, an event 406 arises from the player making a 100 credit wager on a game, such as slots. In an embodiment employing the architecture shown in FIG. 2, the wagering game unit 204 may detect a 100 credit wager on a slots game, and transmit an event message 407 to the credit balance unit 210. The credit balance unit can insert an event tag 408 into the credit event queue 443, where the event tag indicates the 100 credit wager. Based on the event tag 408, the credit balance unit determines that the actual credit balance is 9900 (see bottom balance in credit balance stream element 409). The credit balance stream element 409 also indicates that the UI currently shows a credit balance of 10000 (see top balance in 409). Before updating the UI to show the actual credit balance of 9900, the credit balance unit presents an event tag (see 406) in the UI. The UI event tag indicates that a 100 credit wager will be subtracted from the credit balance shown in the UI. After a delay to allow a player to read the event tag in the UI, the credit balance unit updates the credit balance from 10,000 to 9,900 (see 410) in the UI.

As the event stream 400 progresses, an event 412 arises, indicating that a 100 credit wager has been automatically placed for a play-while-away game. Some embodiments enable players to configure play-while-away games to automatically wager when certain conditions are met (e.g., periodically, to keep the game going, after a game is over, etc.). In response to the automatic wager, the wagering game unit 204 can send, to the credit balance unit 210, a message 413 indicating the automatic wager. In response to the message 413, the credit balance unit inserts an event tag 414 into the credit event queue 443. Based on the event tag 414, the credit balance unit determines that the actual credit balance is 9800—see bottom balance in credit balance stream element 415. The credit balance stream element 415 also indicates that the UI currently shows a credit balance of 9900 (see top balance in 415). Before updating the UI to show the actual credit balance of 9800, the credit balance unit presents an event tag in the UI. The UI event tag indicates that a 100 credit wager for a play-while-away game will be subtracted from the credit balance shown in the UI. After a delay to allow a player to read the event tag in the UI, the credit balance unit updates the credit balance shown in the UI from 9900 to 9800 (see 416).

As the event stream 400 progresses, an event 417 occurs. The event 417 indicates that a player has won 50 credits in a wagering game that is still ongoing. The event 417 may occur in a wagering game unit 204. In some embodiments, the wagering game units do not transmit credit-related "win" messages to the credit balance unit until games have concluded. That is, the wagering game units may not transmit win messages for ongoing wagering games. For these embodiments, the wagering game units can maintain win balances separate from those in the credit balance stream 442. Each win meter may show a credit balance for an ongoing instance of the game. After games are finished, wagering game units can transmit credit-related messages to the credit meters. Because the event 417 is associated with an ongoing game, the wagering game unit does not transmit a message indicating the 50 credit win. Consequently, the credit balance unit does not change the credit balance in the UI (see 416).

As the event stream 400 progresses, the event 418 indicates a 200 credit award for a play-while-away game. A wagering game unit may generate the event 418 and transmit a message 419 to the credit balance unit. The message 419 notifies the credit balance unit about the 200 credit award. In response to the message 419, the credit balance unit inserts an event tag (see 420) in the credit event queue 443. The event tag indicates a pending 200 credit increase to the credit balance. As shown (see 421), the credit balance unit determines the actual credit balance (i.e., 10,000 credits), but does not yet update the user interface.

Before the credit balance unit updates the credit balance in the user interface, additional events occur.

The event stream 400 progresses with a game-over event 422. The game-over event 422 is associated with the win event 417. Both events 417 and 422 arose from the same wagering game. As noted above, some wagering game units may not publish win messages to the credit balance unit for ongoing games. At this point in the event stream 400, the wagering game has concluded. Because the game has concluded, the wagering game unit notifies the credit balance unit about the credit-related win event that occurred during the game (message 423). Upon receiving the message 423, the credit balance unit adds an event tag to the credit event queue (see 424). At this point in time, the credit event queue includes two event tags—an event tag indicating an impending 200 credit increase to the credit balance, and another event tag indicating a 50 credit increase to the credit balance. The credit balance unit presents both tags in the UI. The credit balance unit can also determine, based on the event tag 414, that the actual credit balance is 10,050 credits (see 425). Although the credit balance unit has determined the actual credit balance, the UI still shows a 9800 credit balance (see 425). Before updating the credit balance in the UI, the credit balance unit may introduce a delay to enable the player to visually inspect the two event tags presented in the UI. After the delay, the credit balance unit can increment the credit balance from 9800 credits to 10,000 credits in the UI (see 426). Next, the credit balance unit removes the 200 win event tag from the queue, leaving the 50 credit win remaining in the queue (427). After a delay to enable the player to inspect the remaining event tag (427), the credit balance unit makes a 50 credit addition to the credit meter in the UI (see 430).

As the event stream 400 progresses, an event 427 occurs. The event 427 indicates that a wagering game unit has made an automatic 100 credit wager on behalf of the player. The wager is for a play-while-away game. The wagering game unit transmits a message 428 to the credit balance unit indicating the 100 credit wagering. In response, the credit balance unit inserts an event tag (see 429) in the credit event queue 443, and presents the tag in the user interface. The event tag (see 429) indicates an impending 100 credit reduction to the credit balance. The credit balance unit also determines the actual credit balance (9950 credits—see 430) without updating the UI.

The stream 400 progresses with a player cash-out event 431. The cash-out event transfers the credit balance to a player's electronic wallet. In some embodiments, the player wallet unit 212 generates the cash-out event 431, and sends a cash-out message 432 to the credit balance unit 210. After receiving the message 432, the credit balance unit adds an event tag (see 433) to the credit event queue 443. The event tag 433 indicates an impending 9950 credit reduction to the credit balance. At this point, there are two event tags in the queue 443 (−100 play-while-away wager, and −9950 cash-out). These tags appear in the UI to notify the player of impending changes to the credit meter. Before updating the credit balance in the UI, the credit balance unit determines that the actual balance is 0 credits (see 434). At this point, the UI indicates a credit balance of 10,050 credits (see 434). After a brief delay to enable players to inspect the event tags in the UI, the credit balance unit updates the UI to indicate a credit balance of 9950 credits—reducing the 10,500 balance based on the −100 play-while-away wager event (see 435). Before the credit balance unit processes all the remaining event tags, other events occur.

The event stream 400 continues with an event 436 indicating a play-while-away award of 25 credits. A wagering game unit generates the event 436, and transmits a corresponding message 437 to the credit balance unit. In response to the message 437, the credit balance unit adds an event tag to the credit event queue 443 (see 438). At this point, the queue 443 includes two event tags—−9950 cash-out and +25 play-while-away win. After a brief delay to enable the player to inspect the event tags, the credit balance unit updates the credit balance shown in the UI. After the delay, the credit balance unit reduces the credit balance in the UI from 9950 credits to 0 credits. At this point, there is one event tag remaining in the credit event queue 443—+25 play-while-away win (see 439). The credit balance unit waits a brief time for the player to inspect the event tags. After the delay, the credit balance unit increases UI credit balance by 25 credits (see 440).

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable storage media, while in other embodiments, the operations can be performed by hardware and/or other logic. In some embodiments, the operations can be performed in series, while in other embodiments, one or more of the operations can be performed in parallel. Moreover, some embodiments can perform less than all the operations shown in any flow diagram.

Figure 5:
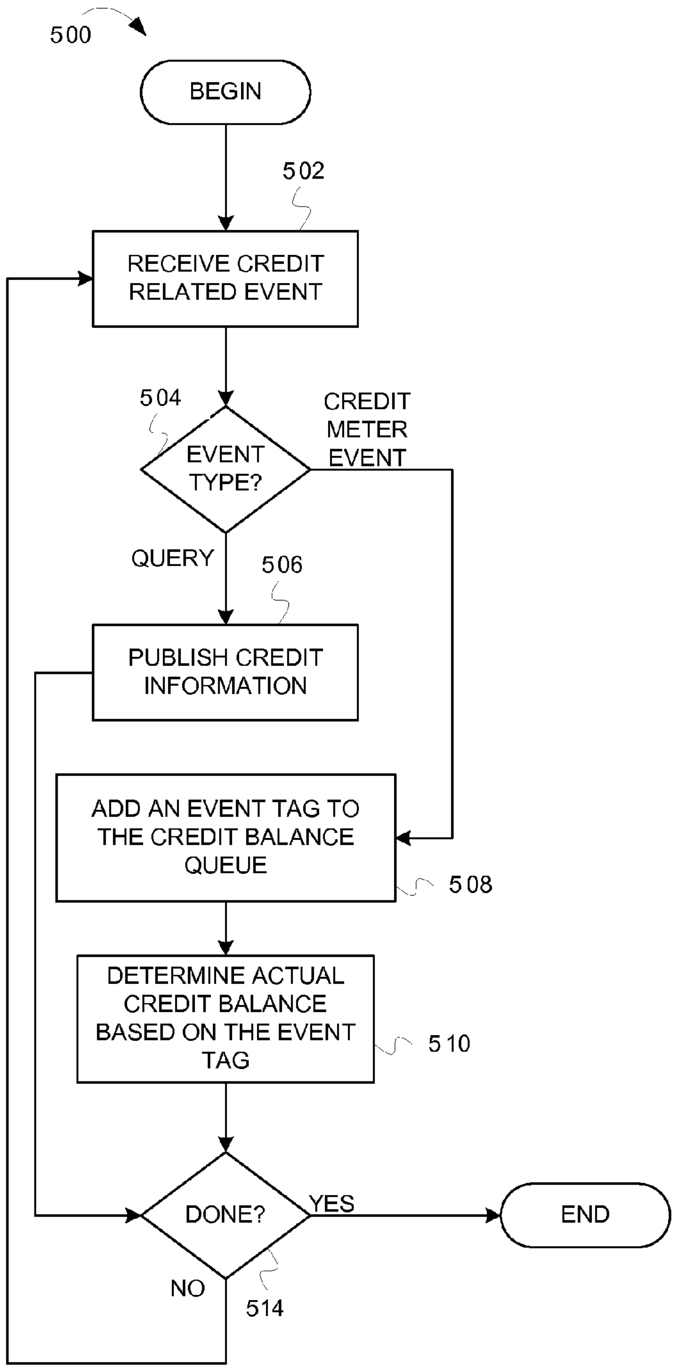
FIG. 5 is a flow diagram illustrating operations for processing credit-related messages, according to embodiments of the inventive subject matter.

FIG. 5 is a flow diagram illustrating operations for processing credit-related events, according to embodiments of the inventive subject matter.

The flow 500 begins at block 502, where a credit balance unit receives a credit-related message. The credit-related message can indicate that a credit-related event has occurred (e.g., wager, win, etc.), or that a component has sent a query to the credit balance unit. At block 504, the credit balance unit determines whether a credit-related event has occurred. If the credit-related message indicates a credit-related event, such as a win or wager, the flow continues at block 508. If the credit-related message indicates a query, the flow continues at block 506.

At block 506, the credit balance unit has determined that the credit-related message was a query. For a query, the credit balance unit publishes credit information (e.g., credit balance) to an aggregator, which disseminates the credit information to the requester. The requester can be a wagering game unit or other component in a wagering game system.

At block 508, the credit balance unit adds an event tag to the credit event queue. In some embodiments, the credit event queue is an internal data structure indicating credit-related events that have occurred in the wagering game system. As will be described, the credit balance unit can use the credit event queue to present event tags in the user interface, and update credit balances in the user interface. The flow continues at block 510.

Figure 6:
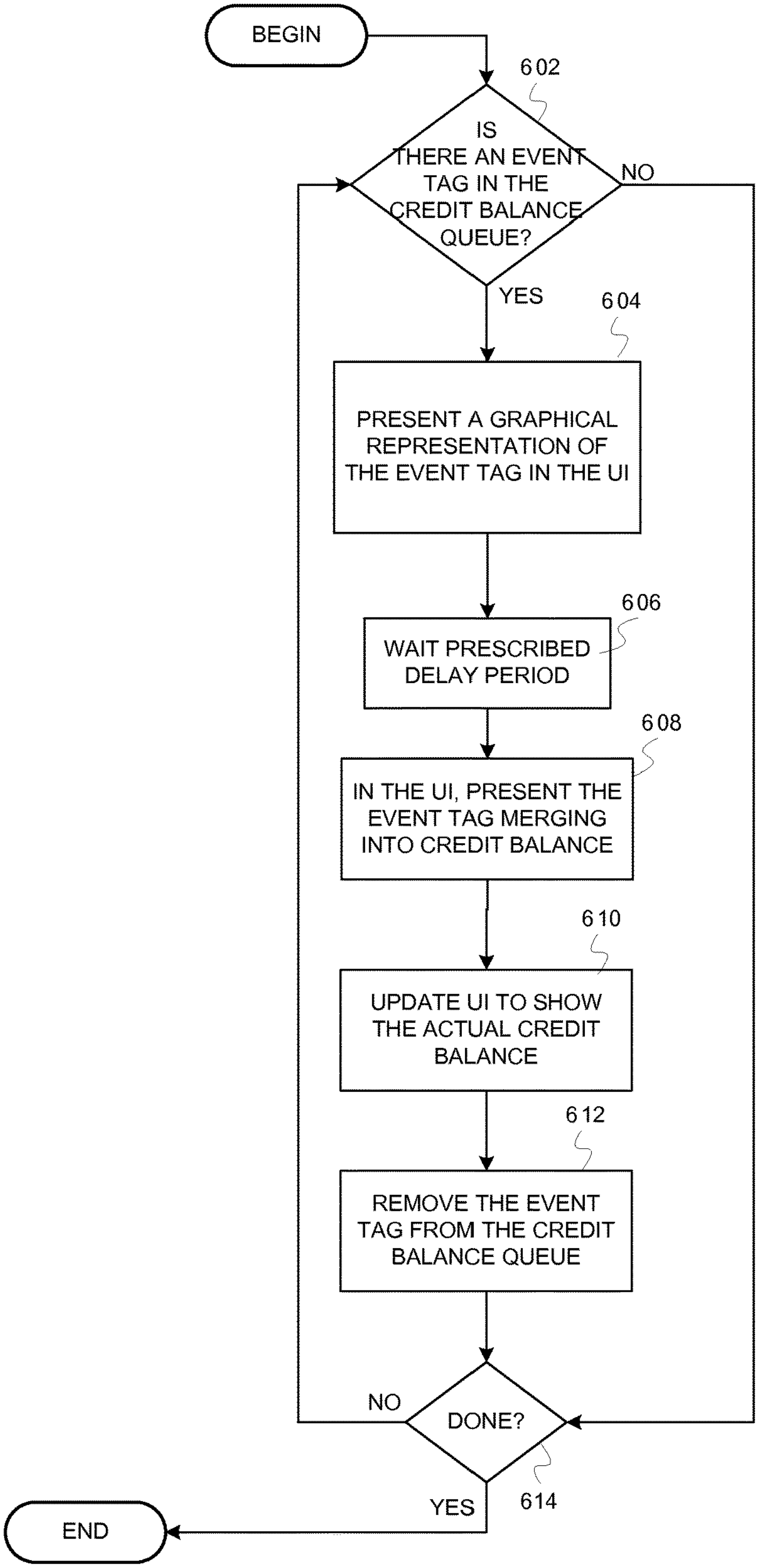
FIG. 6 is a flow diagram illustrating operations for removing items from the credit event queue, and updating credit balances in a user interface.

At block 510, the credit balance unit identifies an event associated with the event tag in the credit event queue, and determines an actual credit balance based on the event. For example, consider a 50 credit win event and an initial credit balance of 40 credits. The actual credit balance becomes 90 credits. At this point, the credit balance unit may not have updated the credit balance in the UI (i.e., the UI still indicates a 40 credit balance). Therefore, the actual credit balance may differ from what is shown in the UI (90 credit actual balance, and 40 credit UI balance). The credit balance unit may purposely delay the UI update to perform operations that notify the player about why the credit meter will be changing. FIG. 6 describes operations for updating credit balances in the UI, and will be explained below. Some regulatory jurisdictions may require the UI to match the internal version of the credit balance (i.e., the actual credit balance). Embodiments can meet this requirement by showing the actual credit balance in a less prominent manner or in an inconspicuous location in the UI—while also using the chevron tags and other graphical effects described above. That is, while some embodiments may present the actual balance in the UI at 508, those embodiments also perform operations for presenting the chevron tags and other effects that enable players to better understand changes to the credit balance. The flow continues at block 510.

From block 510, the flow continues at block 512, where the credit balance unit determines whether the flow is over. If the flow is over, the flow proceeds to end. Otherwise, the flow continues back at block 502.

The discussion continues with operations shown in FIG. 6. As noted, FIG. 5 shows operations for inserting events into the credit event queue. FIG. 6 is a flow diagram illustrating operations for removing items from the credit event queue, and updating credit balances in a user interface.

At block 602, the credit balance unit determines whether there is an event tag in the credit event queue. If there is not an event tag in the queue, the flow loops back to 602. If there is an event tag in the credit event queue, the flow continues at block 604.

At block 604, the credit balance unit presents a graphical representation of the event tag in the user interface. The graphical representation of the event tag can be a chevron-shaped graphical identifier indicating the event. In FIG. 1, the credit balance unit presents event tag 104, which indicates a 100 credit wager on Kronos. If there are other event tags in the UI, the credit balance unit can daisy-chain event tags together to indicate a sequence of events that will affect the credit balance. If the credit-related event was a 25 credit automatic wager for a play-while-away game, the event tag may identify the play-while-away game and the wager mount. The tag may also indicate whether the event will increase or decrease the credit meter, such as by using "+" and "−". An event tag for the 25 credit automatic play-while-away wager may include the following text: "−25 Fishbowl Play-While-Away wager". For a 50 credit slots win, the event tag may include the following text: "+50 Slots Win".

Although some embodiments employ a chevron-shaped tag, other embodiments can employ any suitable graphical indicia (including colors, shapes, text, etc.).

At block 606, the credit balance unit waits a prescribed delay period before updating the UI. For example, the credit balance unit may wait a few seconds before further modifying the event tags and credit balance shown in the UI. As discussed above, the credit balance unit has presented at least one event tag in the UI. The delay gives players time to visually inspect the credit balance and the event tag(s) shown in the UI. The delay period can last any suitable duration, such as anywhere from one to four seconds. The flow continues at block 608.

At block 608, the credit balance unit graphically merges the event tag into the credit balance. FIG. 1's stage 3 shows an example of how the credit balance unit can present graphics representing the event tag merging into the credit balance. Other embodiments may present other graphics indicating that the credit balance is about to be affected in an amount shown in the event tag. Some embodiments may omit the operation at block 608, choosing to proceed straight to block 610.

At block 610 the credit balance unit updates the credit balance in the UI, based on the event tag. For example, for an event tag indicating a 50 credit win, the credit balance unit increments by 50 credits the credit balance shown in the UI. At block 612, after updating the credit balance in the UI, the credit balance unit removes the event tag from the credit event queue—both in the UI and in the internal data structure. The flow continues at block 614, where the credit balance unit determines whether the flow is over. If the flow not over, the flow loops back to block 602. Otherwise the flow proceeds to end.

Example Graphics and Animations

Figure 7:
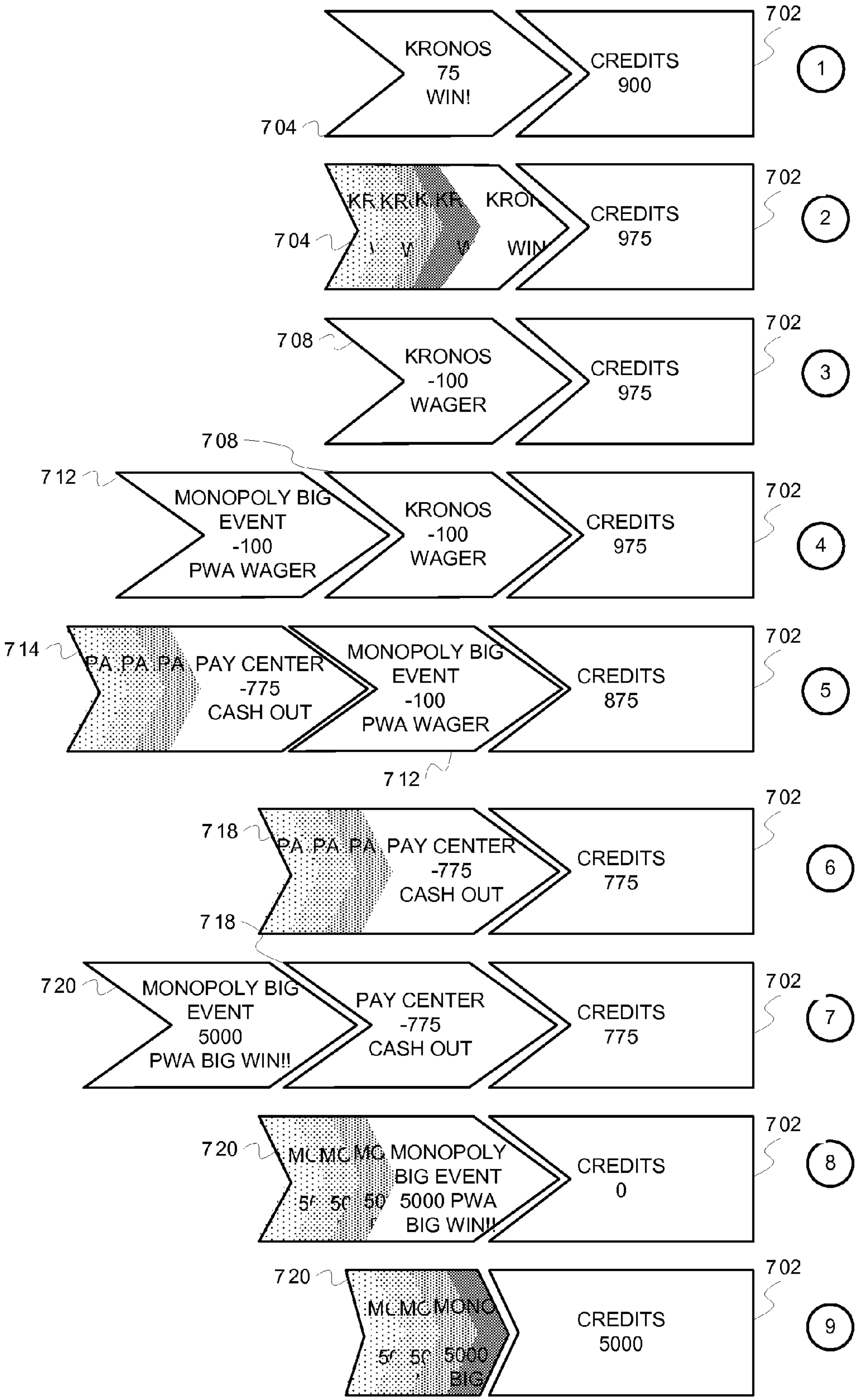
FIG. 7 is a conceptual diagram showing how some embodiments present event tags before modifying a credit balance in a user interface.

FIG. 7 is a conceptual diagram showing how some embodiments present event tags before modifying a credit balance in a user interface. FIG. 7 shows nine stages in which event tags appear before a credit balances modified. As described above, the event tags may be associated with events occurring in a wagering game system. In some embodiments, a credit balance unit presents the event tags shown in FIG. 7. However, other embodiments may utilize other components to present the event tags.

During stage 1, a credit meter 702 shows a credit balance of 900 credits. The system presents an event tag 704 indicating a 75 credit win for Kronos (a wagering game). Before incrementing the credit meter and removing the event tag 704, the system allows the event tag 704 to briefly reside in the user interface. The system also presents animations indicating that 75 credits will be added to the credit meter 702.

During stage 2, system presents animation on event tag 704. The animation symbolizes movement of the 75 credits onto the credit meter. Also during stage 2, the system increments the credit meter 702 by 75 credits. At this point, the credit meter 702 has a credit balance of 975 credits.

During stage 3, the system presents an event tag 708 indicating a 100 credit wager on Kronos. The credit balance is still 975 credits.

During stage 4, the system presents an additional event tag 712 along with the event tag 710. The event tag 712 indicates a 100 wager on a play-while-away game. As described above, some embodiments daisy-chain event tags to indicate a plurality of events that will affect the credit balance. The credit balance is still 975 credits. In some instances, event tags accumulate because a plurality of credit-related events occur close in time. Before modifying the credit meter for each credit-related event, the system presents the event tags for a time period long enough for players to comprehend what events have occurred. For example, the system may delay one to three seconds for each event tag. Embodiments support any suitable time for the delay.

Stage 5 picks up after the system has removed the event tag 708 (−100 wager), and modified the credit meter 602 to show a credit balance of 875 credits. The event tag 712 (−100 wager) remains in the queues. During stage 5, an event tag 714 is added to the event tag queue. The event tag 714 indicates that player has cashed out the credit balance. When the player cashed-out, the system had not yet modified the credit balance based on the event tag 712 (−100 wager). However, because the 100 credit wager (event tag 712) has already been made, the actual credit balance is 775, not the 875 shown on the credit meter 702. Therefore, the cash-out amount is 775 in stage 5.

During stage 6, the system has updated the credit balance based on the 100 credit wager associated with the event tag 712. At this point, the credit balance is 775, and the event tag 718 (−775 cash out) remains in the queue. During stage 6, an event 620 is added to the queue. The event 720 indicates a 5000 credit win for a play-while-away game.

Stage 8 shows the credit meter 702 after the system has modified the credit balance to reflect the 775 credit cash out (event tag 718). At this point, the credit balance is zero. The event tag 724 (5000 credit play-one-away win) is the only tag remaining in the queue.

In stage 9, the system animates the tag 720 to symbolize 5000 credits moving on to the credit meter 702. The system also updates the credit meter 702 to have a credit balance of 5000 credits.

Example User Interfaces

Figure 8:
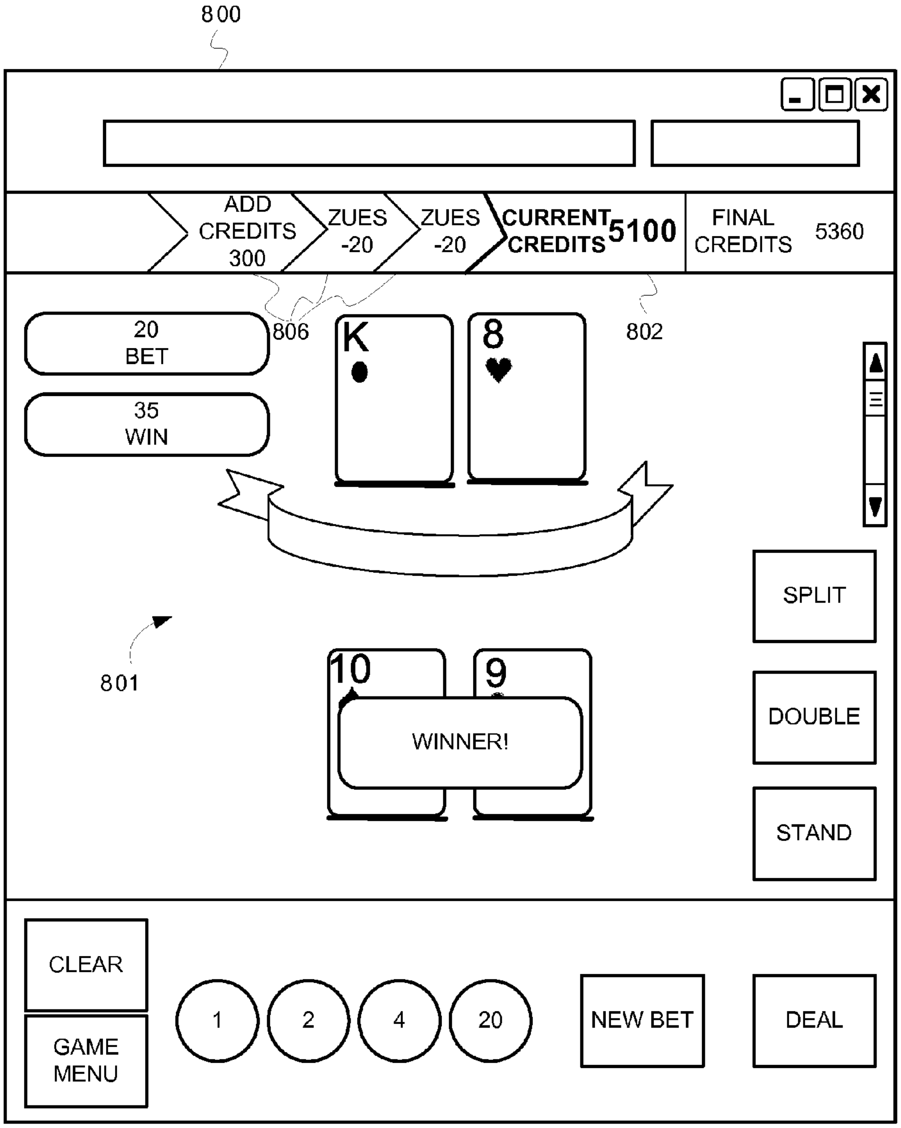
FIG. 8 is a user interface for presenting a wagering game, according to some embodiments of the inventive subject matter.
Figure 9:
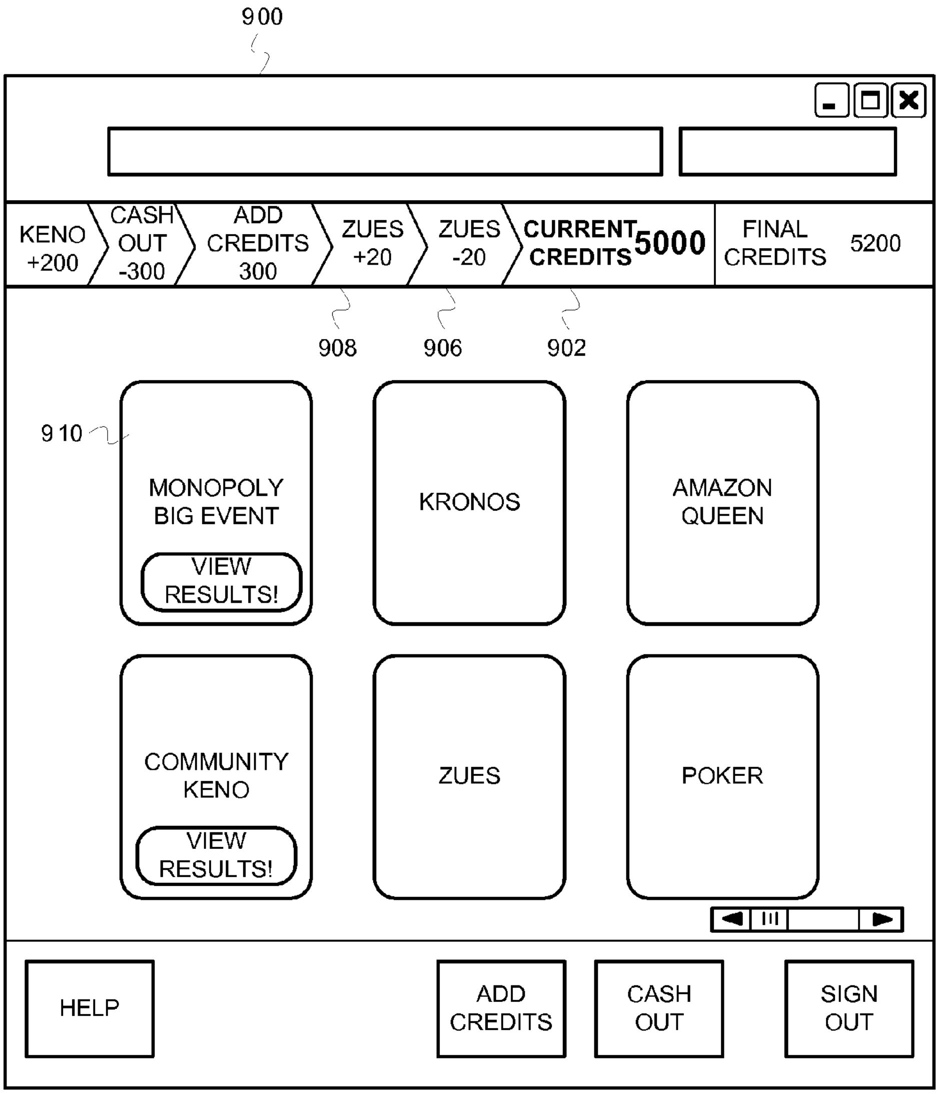
FIG. 9 shows a user interface for selecting games, according to some embodiments of the inventive subject matter.

This section describes example user interfaces used with some embodiments of the inventive subject matter. Because embodiments can conduct wagering games that may not appear in a user interface (e.g., play-while-away games), embodiments may present event tags indicating credit-related events that have occurred in the wagering game system. As described above, the event tags also indicate impending updates to the credit balance. Over time, embodiments can update the credit balance as indicated by the event tags. Such credit balance updates can occur in a plurality of situations, such as during games presented in the UI, during game selection, during player wallet operations, etc. FIG. 7 shows a UI for presenting a wagering game, FIG. 8 shows a UI for game selection, and FIG. 9 shows a UI for managing a player wallet. For each of these UIs, the system presents event tags, and updates the credit balance based on the event tags (as described herein).

FIG. 8 is a user interface for presenting a wagering game, according to some embodiments of the inventive subject matter. In FIG. 8, a user interface 800 includes a gaming area 801 in which a blackjack game is presented. The gaming area 801 includes various controls for playing blackjack game (betting controls, card-related controls, etc.). The user interface 800 also includes a win meter 808, credit meter 802, and an event tag queue 806. The win meter 808 indicates wins associated with ongoing games. The credit meter 802 shows current credits and final credits. The current credits indicate the credit balance before all event tags in the event tag queue 806 have been processed. The final credits indicate what the credit balance will be after all event tags have been processed.

As shown, the event tag queue 806 includes three event tags—two event tags for 20 credit wagers on Zeus (−20 Zeus), and an event tag indicating a 300 credit addition from a player wallet (add credits 300). Zeus is a game that is not shown in the UI 800. The credit meter's "current credits" indicator shows 5100 credits, whereas the "final credits" indicator shows 5360 credits. Therefore, before the event tags are processed, the credit balance is 5100 credits. However, after the system processes the three event tags in the queue 806, the credit balance will be 5360 credits.

In some embodiments, the win meter 808 keeps track of wins until the game is over. After the game is over, the system increments the credit meter 802 based on the win meter 808. For example, at the conclusion of the game presented in the gaming area 801, the system will present an event tag in the queue 806. The event tag will indicate credits won during the game. The system will also update the credit meter's current and final credits, accordingly.

FIG. 9 shows a user interface for selecting games, according to some embodiments of the inventive subject matter. As shown in FIG. 9, a UI 900 includes a game selection area 911. The game selection area 911 includes icons for selecting wagering games to play. The primary function of the UI 900 is for selecting wagering games. However, the UI 900 includes a credit meter 902 to keep players informed about credit-related events that affect the credit balance. Some credit-related events may include automatic wagers and wins for games that are not shown in the UI 900. The credit meter 902 shows current credits, and final credits. The current credits indicate the credit balance before all event tags in the event tag queue 912 have been processed. The final credits indicate what the credit balance will be after all event tags have been processed. The UI 900 also includes an event tag queue 912. The event tag queue 912 includes five event tags 906: 1) −20 Zeus, 2) +20 Zeus, 3) add 300 credits, 4) cash out −300, 5) Keno win 200. The system will process the credit-related events, and update the credit meter's current and final balances accordingly.

Figure 10:
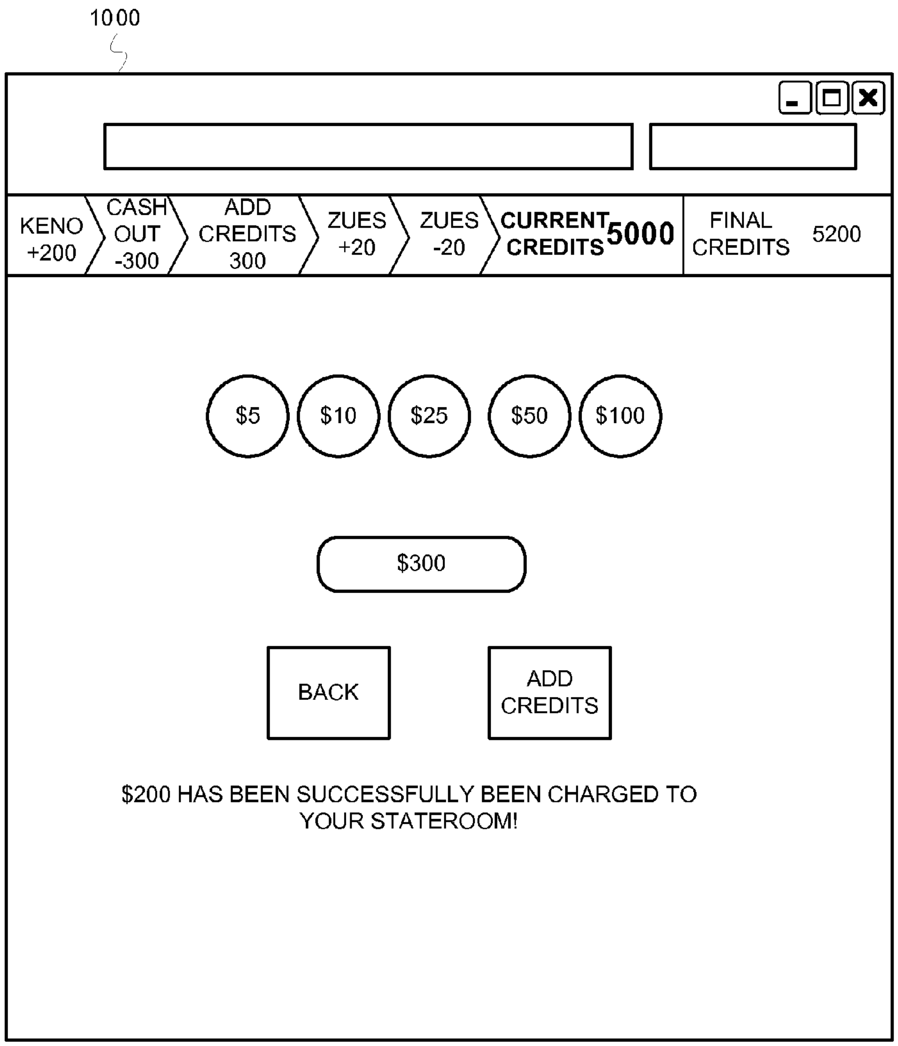
FIG. 10 shows a user interface for managing a player wallet, according to some embodiments of the inventive subject matter.

FIG. 10 shows a user interface for managing a player wallet, according to some embodiments of the inventive subject matter. In some embodiments, the player wallet acts as an account that provides funds for use in wagering games. In FIG. 10, a user interface 1000 includes controls 1008 for facilitating financial transactions, such as adding credits to the wallet, and using this credits to fund wagering games. The user-interface 1000 also includes a credit meter 1002, and event tag queue 1004. The event tag queue includes event tags 1006. As shown, the event tag queue 1004 includes five event tags. The credit meter 1002 shows current credits and final credits, as described above. The system updates the credit meter 1002 and event tag queue 1006 as described above.

Additional Embodiments

Some embodiments enable players to view a history of past credit-related events. Some embodiments may enable players to view all event tags that have appeared in the event tag queue during a wagering game session. In some implementations, the system allows the user to enter a credit history interface that presents controls for viewing the credit-related events. For example, a credit history interface may include controls (e.g., scrollbars, scroll wheels, etc.) that enable players to view and move through a listing of event tags. The event tags may be daisy-chained, as described above. Alternatively, the system may present the event tags in any suitable fashion. That is, the system may present credit-related event histories in other graphical forms, such as in tables, graphs, charts, etc.

Some embodiments enable players to fast-forward through event tags. For example, if a relatively large number of event tags appear queued-up for merging into a credit meter (or other representation of the credit balance), players can activate a fast-forward control that accelerates the process of merging the tags into the credit meter. Some embodiments offer a rewind function that, when activated, presents past event tags in the order in which they were originally processed. If a player rewinds through more event tags than they care to see, they can move forward though them via the fast-forward function. To enable the rewind function, some embodiments save events and event tags. For example, some embodiments may store the event tags in a file, after they are removed from the event tag queue.

As noted above, players can configure the system to automatically place wagers for certain games (e.g., play-while-away games). Some embodiments may present event tags indicating upcoming automatic wagers before the wagers are deducted from the credit meter. For example, a player may configure the system to automatically place wagers for a play-while-away fishbowl game. More specifically, the player may configure the system to place an automatic wager just before the player's fish dies, ending the game. The system can monitor an energy level of the player's fish. When the energy level indicates the fish will soon die, the system can present an event tag indicating an impending automatic wager. Some embodiments allow the player to utilize the event tag to cancel the wager before it is deducted from the credit balance. If a player sees an event tag indicating an impending automatic wager, the player can activate the tag (e.g. mouse click, touchscreen touch, etc.) to cancel the automatic wager. After an event tag is activated, some embodiments may present options, such as cancelling the current instance of the automatic wager, cancelling the automatic wager altogether, reconfiguring conditions that trigger the automatic bet, etc.

Wagering Game Machines and Wagering Game Networks

Figure 11:
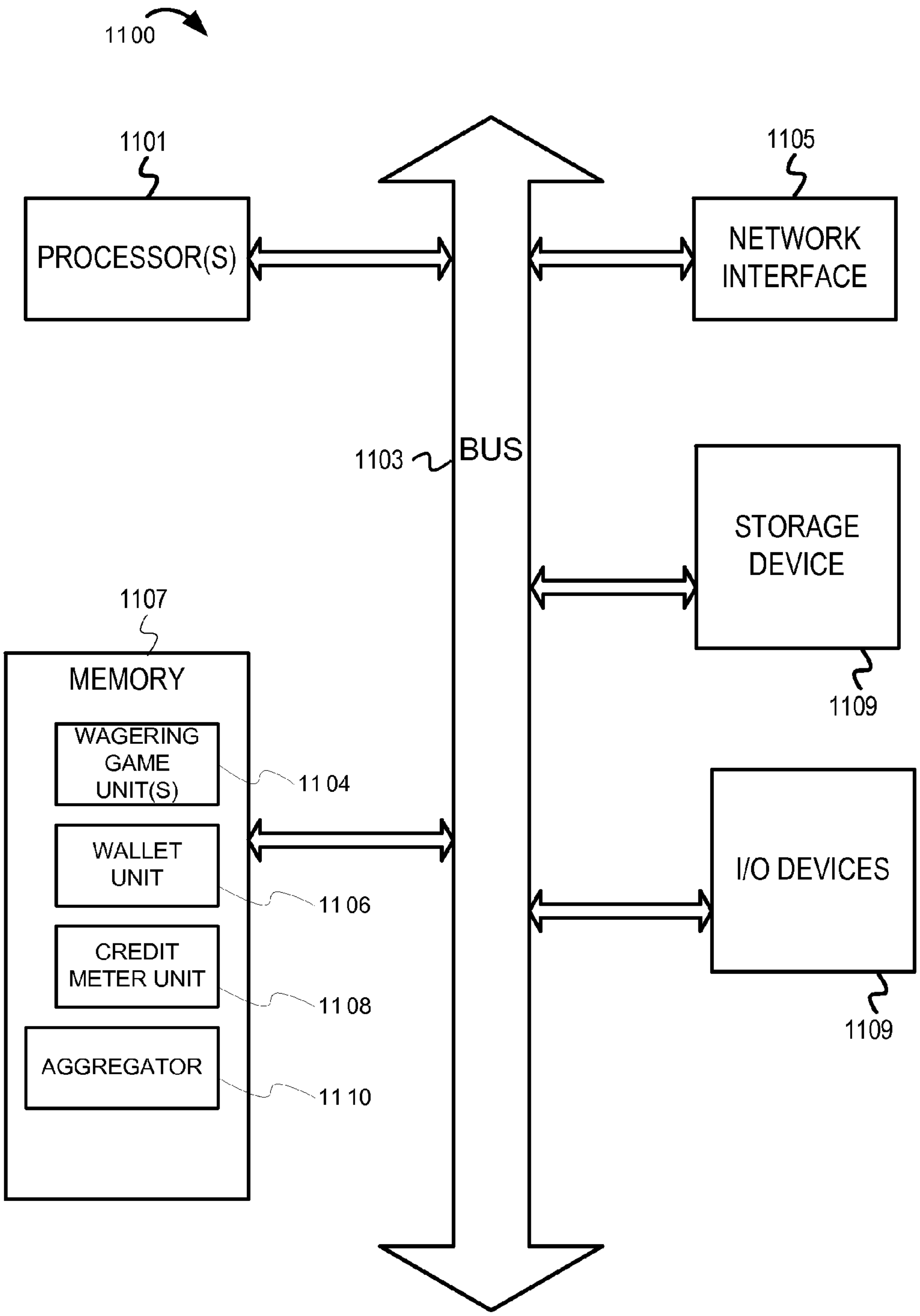
FIG. 11 is a block diagram illustrating an example configuration for a wagering game machine, according to some embodiments of the invention.

FIG. 11 is a block diagram illustrating an example configuration for a wagering game machine, according to some embodiments of the invention. In FIG. 11, a computing device 1100 includes a processor unit 1101 (possibly including multiple processors, multiple cores, multiple nodes, and/or implementing multi-threading, etc.). The computer device also includes memory 1107. The memory 1107 may be system memory, such as one or more of cache, SRAM, DRAM, zero capacitor RAM, Twin Transistor RAM, eDRAM, EDO RAM, DDR RAM, EEPROM, NRAM, RRAM, SONOS, PRAM, etc.

The memory 1107 includes wagering game unit(s) 1104, wallet unit 1106, credit balance unit 1108, and aggregator 1110. These components can perform the operations described above.

The computer system also includes a bus 1103 (e.g., PCI, ISA, PCI-Express, HyperTransport®, InfiniBand®, NuBus, etc.), a network interface 1105 (e.g., an ATM interface, an Ethernet interface, a Frame Relay interface, SONET interface, wireless interface, etc.), and a storage device(s) 1109 (e.g., optical storage, magnetic storage, etc.).

The system memory 1107 includes components to implement embodiments described above. For example, the system memory 1107 includes Some embodiments may include fewer or additional components not illustrated in FIG. 11 (e.g., video cards, audio cards, additional network interfaces, peripheral devices, etc.). The processor unit 1101, the storage device(s) 1109, and the network interface 1105 are coupled to the bus 1103. Although illustrated as being coupled to the bus 1103, the memory 1107 may be coupled to the processor unit 1101.

Any component described herein can include hardware, firmware, and any computer readable media including instructions (e.g., program code) for performing the operations described herein. Any combination of one or more computer-readable medium(s) may be utilized. The computer-readable medium may be a computer-readable signal medium or a computer-readable storage medium. Some examples (a non-exhaustive list) of the computer-readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Wagering game machines and other electronic devices can form wagering game networks. FIG. 11 describes wagering game networks in more detail.

Figure 12:
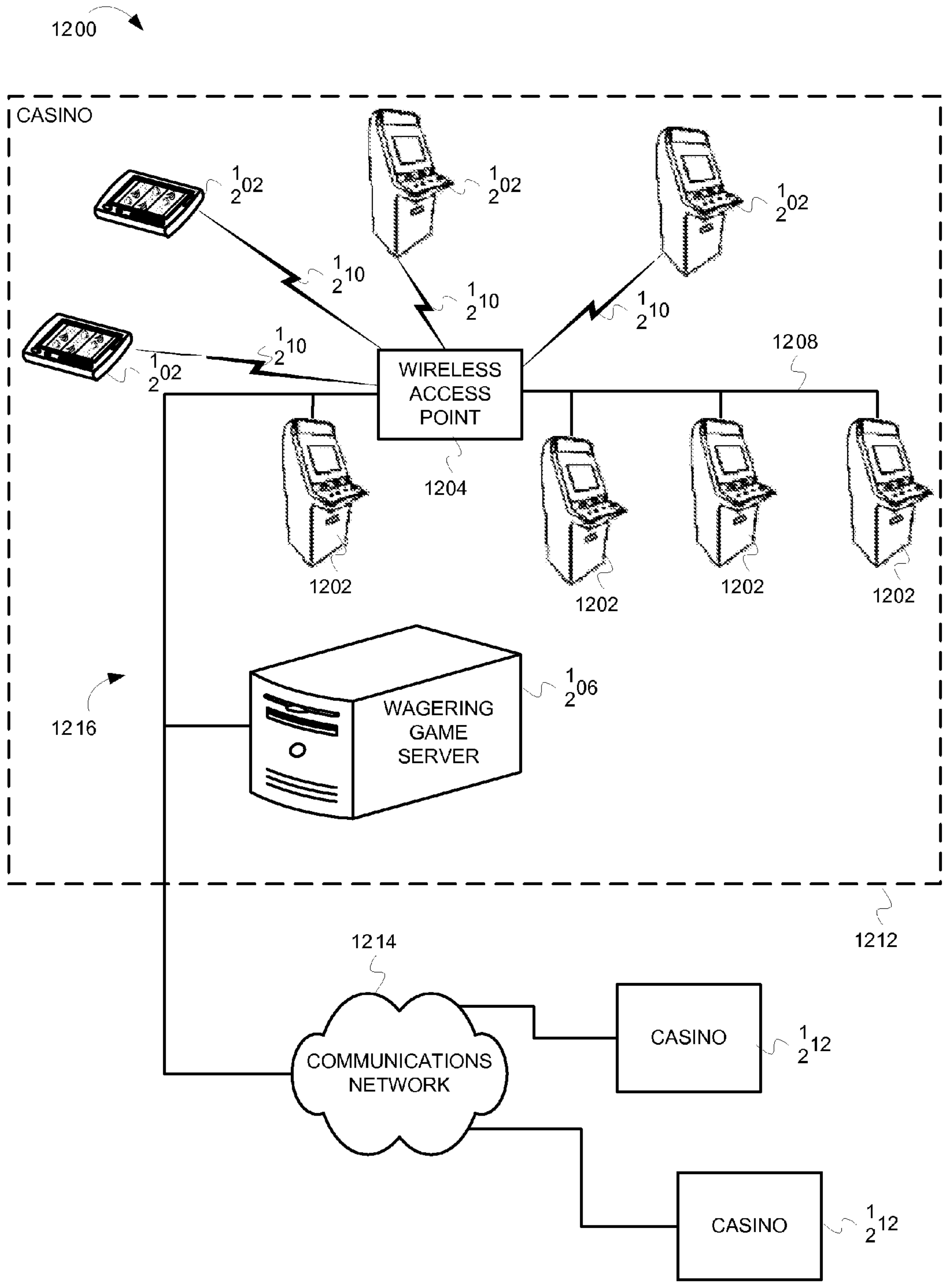
FIG. 12 is a block diagram illustrating a wagering game network, according to example embodiments of the invention.

FIG. 12 is a block diagram illustrating a wagering game network 1200, according to example embodiments of the invention. As shown in FIG. 12, the wagering game network 1200 includes a plurality of casinos 1212 connected to a communications network 1214.

Each casino 1212 includes a local area network 1216, which includes an access point 1204, a wagering game server 1206, and wagering game machines 1202. The access point 1204 provides wireless communication links 1210 and wired communication links 1208. The wired and wireless communication links can employ any suitable connection technology, such as Bluetooth, 802.11, Ethernet, public switched telephone networks, SONET, etc. In some embodiments, the wagering game server 1206 can serve wagering games and distribute content to devices located in other casinos 1212 or at other locations on the communications network 1214.

The wagering game machines 1202 described herein can take any suitable form, such as floor standing models, handheld mobile units, bartop models, workstation-type console models, etc. Further, the wagering game machines 1202 can be primarily dedicated for use in conducting wagering games, or can include non-dedicated devices, such as mobile phones, personal digital assistants, personal computers, etc. In one embodiment, the wagering game network 1200 can include other network devices, such as accounting servers, wide area progressive servers, player tracking servers, and/or other devices suitable for use in connection with embodiments of the invention.

In some embodiments, wagering game machines 1202 and wagering game servers 1206 work together such that a wagering game machine 1202 can be operated as a thin, thick, or intermediate client. For example, one or more elements of game play may be controlled by the wagering game machine 1202 (client) or the wagering game server 1206 (server). Game play elements can include executable game code, lookup tables, configuration files, game outcome, audio or visual representations of the game, game assets or the like. In a thin-client example, the wagering game server 1206 can perform functions such as determining game outcome or managing assets, while the wagering game machine 1202 can present a graphical representation of such outcome or asset modification to the user (e.g., player). In a thick-client example, the wagering game machines 1202 can determine game outcomes and communicate the outcomes to the wagering game server 1206 for recording or managing a player's account.

In some embodiments, either the wagering game machines 1202 (client) or the wagering game server 1206 can provide functionality that is not directly related to game play. For example, account transactions and account rules may be managed centrally (e.g., by the wagering game server 1206) or locally (e.g., by the wagering game machine 1202). Other functionality not directly related to game play may include power management, presentation of advertising, software or firmware updates, system quality or security checks, etc.

Any of the wagering game network components (e.g., the wagering game machines 1202) can include hardware and machine-readable media including instructions for performing the operations described herein. The components shown in FIG. 2 can be included one or more devices of FIG. 12. For example, in some embodiments, all the wagering game machines 1202 can include all the components of FIG. 2. In other embodiments, the wagering game machines 1202 include wallet units, and credit balance units, whereas the wagering game unit(s) and aggregator reside on the wagering game server 1206.

Figure 13:
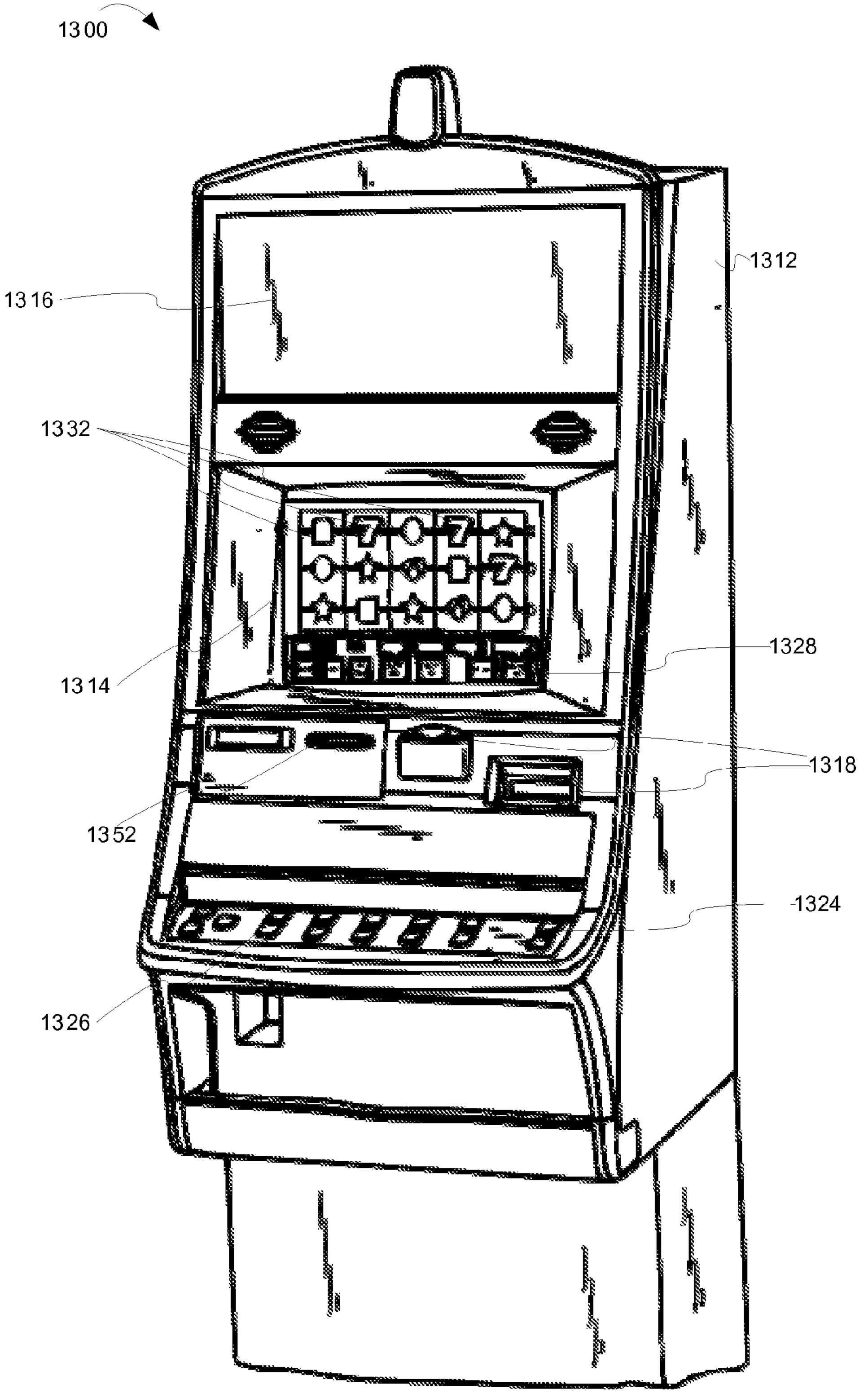
FIG. 13 illustrates a gaming terminal similar to those used in gaming establishments, such as casinos.

FIG. 13 illustrates a gaming terminal 1310 similar to those used in gaming establishments, such as casinos. The gaming terminal 1310 may be any type of gaming terminal and may have varying structures and methods of operation. For example, in some aspects, the gaming terminal 1310 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 1310 may take any suitable form, such as floor-standing models as shown, handheld mobile units, bartop models, workstation-type console models, etc. Further, the gaming terminal 1310 may be primarily dedicated for use in conducting wagering games, or may include non-dedicated devices, such as mobile phones, personal digital assistants, personal computers, etc.

The gaming terminal 1310 illustrated in FIG. 13 comprises a cabinet 1311 that may house various input devices, output devices, and input/output devices. By way of example, the gaming terminal 1310 includes a primary display area 1312, a secondary display area 1314, and one or more audio speakers 1316. The primary display area 1312 or the secondary display area 1314 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 1310. The gaming terminal 1310 includes a touch screen(s) 1318 mounted over the primary or secondary areas, buttons 1320 on a button panel, bill validator 1322, information reader/writer(s) 1324, and player-accessible port(s) 1326 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 1318, buttons 1320, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

In some embodiments, the gaming terminal 1310 can include any of the components shown above, and can perform the operations described above.

General

While the inventive subject matter is susceptible of embodiment in many different forms, there is shown in the drawings and herein described in detail preferred embodiments with the understanding that the present disclosure is to be considered as an exemplification of the principles of the inventive subject matter and is not intended to limit the broad aspect of the inventive subject matter to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for presenting changes to a credit balance affected by a plurality of wagering games conducted via a wagering game machine, the wagering game machine including an electronic processing unit and an electronic display, the method comprising:

detecting, via the electronic processing unit, a plurality of credit modification events based on wager amounts and win amounts associated with the plurality of wagering games, at least one of which is not visible on the electronic display;

creating, via the electronic processing unit, a queue of graphical identifiers associated with the plurality of credit modification events, each graphical identifier in the queue including a representation of its associated credit modification event and wagering game;

presenting the queue of graphical identifiers on the electronic display, in an order in which the plurality of credit modifications events will modify a displayed credit meter, by presenting, for each of the graphical identifiers, a graphical progression comprising:

a first stage, during which the credit meter is presented on the electronic display, a second stage, during which the current one of the graphical identifiers is displayed adjacent to the credit meter, a third stage, during which a graphical sequence animates merging of the graphical identifier of the second stage with the credit meter to present the credit meter as modified by the credit modification event associated with the graphical identifier of the second stage, and a fourth stage, during which the graphical identifier of the second stage is removed from the electronic display.

2. The method of claim 1, wherein at least two of the plurality of wagering games are of different wagering game types, and wherein at least two of the wagering games overlap in time.

3. The method of claim 1, wherein the graphical identifiers include a tag, and wherein a shape of the tag indicates a direction of movement of its graphical identifier relative to the credit meter.

4. The method of claim 1, wherein the detecting includes:
receiving, by a credit meter controller that controls the credit meter, messages from a message aggregator, wherein the messages indicate the wager amounts and the win amounts.

5. The method of claim 4, wherein the presenting of the queue of graphical identifiers occurs under control of the credit meter controller.

6. The method of claim 1, wherein the presenting of the queue of graphical identifiers is not controlled by components controlling the plurality of wagering games.

7. One or more non-transitory, machine-readable storage media having instructions stored thereon, which when executed by a set of one or more processors of an electronic wagering game system, cause the electronic wagering game system to perform operations comprising:
detecting, via the set of one or more processors, a plurality of credit modification events based on wager amounts and win amounts associated with a plurality of wagering games, at least one of which is not visible on an electronic display device;
creating, via the set of one or more processors, a queue of graphical identifiers associated with the plurality of credit modification events, each graphical identifier in the queue including a representation of its associated credit modification event and wagering game;
presenting the queue of graphical identifiers on the electronic display device, in an order in which the plurality of credit modifications events will modify a displayed credit meter, by presenting, for each of the graphical identifiers, a graphical progression comprising:
a first stage, during which the credit meter is presented on the electronic display,
a second stage, during which the current one of the graphical identifiers is displayed adjacent to the credit meter,
a third stage, during which a graphical sequence animates merging of the graphical identifier of the second stage with the credit meter to present the credit meter as modified by the credit modification event associated with the graphical identifier of the second stage and during which the current credit balance is modified according to the credit modification event, and
a fourth stage, during which the graphical identifier of the second stage is removed from the electronic display.

8. The one or more non-transitory, machine-readable storage media of claim 7, wherein the credit balance appears on a credit meter, and wherein the graphical identifier include chevron-shaped tags.

9. The one or more non-transitory, machine-readable storage media of claim 7, said operations further comprising:
receiving user input requesting presentation of one or more of the graphical elements, after the graphical elements have been removed from the electronic display; and
representing the graphical identifiers on the electronic display according to the order.

10. An electronic wagering game system for tracking credit-related events in the electronic wagering game system, the electronic wagering game system comprising:
one or more electronic processing units;
an electronic display device; and
one or more memory storage devices configured to store instructions, which when executed by the one or more electronic processing units, cause the electronic wagering game system to
detect, via the one or more electronic processing units, a plurality of credit modification events based on wager amounts and win amounts associated with a plurality of wagering games, at least one of which is not visible on the electronic display;
create, via the one or more electronic processing units, a queue of graphical identifiers associated with the plurality of credit modification events, each graphical identifier in the queue including a representation of its associated credit modification event and wagering game;
present the queue of graphical identifiers on the electronic display device, in an order in which the plurality of credit modifications events will modify a displayed credit meter, by presenting on the electronic display device, for each of the graphical identifiers, a graphical progression comprising:
a first stage, during which the credit meter is presented on the electronic display device,
a second stage, during which the current one of the graphical identifiers is displayed adjacent to the credit meter,
a third stage, during which a graphical sequence animates merging of the graphical identifier of the second stage with the credit meter to present the credit meter as modified by the credit modification event associated with the graphical identifier of the second stage and during which the current credit balance is modified according to the credit modification event, and
a fourth stage, during which the graphical identifier of the first stage is removed from the electronic display.

11. The electronic wagering game system of claim 10, wherein the one or more memory storage devices are configured to store instructions, which when executed by the one or more electronic processing units, cause the electronic wagering game system to:
pause for a time period after the one or more graphical identifiers are displayed and before the displayed credit balance is modified.

* * * * *